United States Patent [19]

Warden

[11] 4,403,602
[45] Sep. 13, 1983

[54] CONTROL VALVE UNIT FOR SOLAR ENERGY SYSTEM

[76] Inventor: Jerry T. Warden, 2806 Midwood, Lansing, Mich. 48910

[21] Appl. No.: 355,917

[22] Filed: Mar. 8, 1982

[51] Int. Cl.³ ............................................... F24J 3/02
[52] U.S. Cl. ..................................... 126/435; 126/437
[58] Field of Search ................. 165/18; 126/400, 430, 126/432, 435, 436, 437

[56] References Cited

U.S. PATENT DOCUMENTS

| | | | |
|---|---|---|---|
| 3,250,269 | 5/1966 | Sherock | 126/435 |
| 4,021,895 | 5/1977 | Morse | 126/400 |
| 4,044,949 | 8/1977 | Morawetz et al. | 126/400 |
| 4,126,122 | 11/1978 | Bross | 126/435 |
| 4,128,124 | 12/1978 | Worthington | 126/435 |
| 4,129,177 | 12/1978 | Adcock | 126/435 |
| 4,235,223 | 11/1980 | Coxon | 126/437 |
| 4,237,859 | 12/1980 | Goettl | 126/437 |
| 4,291,750 | 9/1981 | Clyne et al. | 126/435 |
| 4,313,419 | 2/1982 | Lyon | 126/437 |
| 4,325,357 | 4/1982 | Wormser | 126/435 |

Primary Examiner—Daniel J. O'Connor
Attorney, Agent, or Firm—Malcolm R. McKinnon

[57] ABSTRACT

A control valve unit for controlling the flow of water through a solar energy system that includes a solar energy heated water storage tank and a conventionally heated water storage tank, the control valve unit incorporating improved valve means which may be installed in a single readily accessible location, which may be easily understood and operated by the users of the solar energy system, and which enables selective independent and/or combined utilization of the separate water storage tanks whereby maximum energy savings may be effected with a minimum of intellectual and physical effort on the part of the users thereof.

12 Claims, 5 Drawing Figures

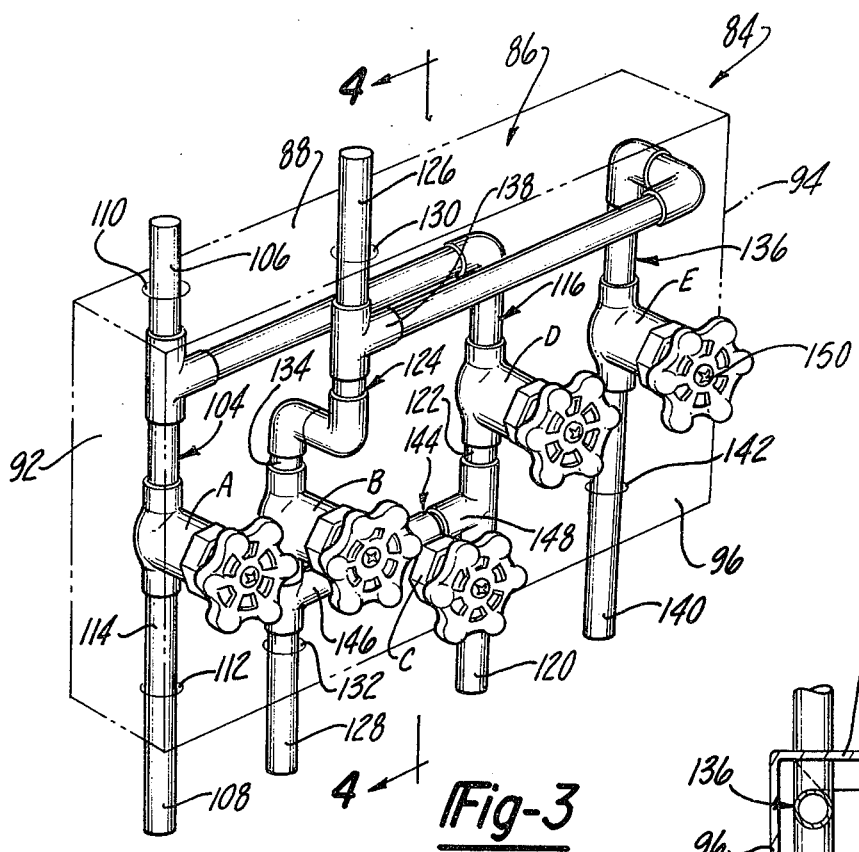
Fig-3
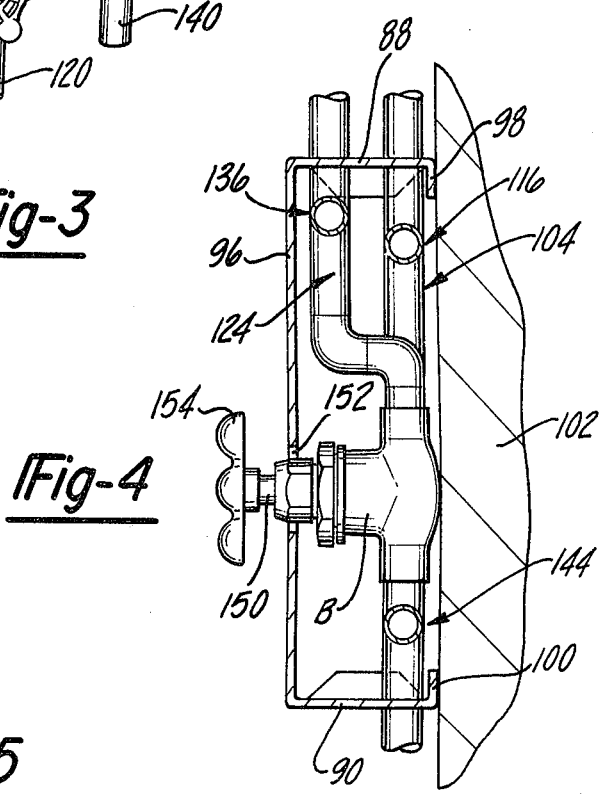
Fig-4
Fig-5
| VALVE | A | B | C | D | E |
|---|---|---|---|---|---|
| DOM. HEAT ONLY | CLOSE | CLOSE | CLOSE | OPEN | OPEN |
| DOM. and SOLAR | OPEN | CLOSE | OPEN | CLOSE | OPEN |
| SOLAR HEAT ONLY | OPEN | OPEN | CLOSE | CLOSE | CLOSE |

CONTROL VALVE UNIT FOR SOLAR ENERGY SYSTEM

BRIEF SUMMARY OF THE INVENTION

This invention relates to control valves and, more particularly, to an improved control valve unit for controlling the flow of water through a solar energy system that includes a solar energy heated water storage tank and a conventionally heated water storage tank. Heretofore, solar energy systems have been provided that include a solar energy heated water storage tank and a conventionally heated water storage tank, the solar energy heated water storage tank functioning to store water heated, for example, through the agency of solar collectors, while the conventionally heated water storage tank functions to store water heated, for example, by the burning of gas, oil, coal or wood or through the agency of electric heating means. The heated water may then be utilized as a supply of hot water for a residential or commercial building or for other purposes.

In order that the solar energy system may be utilized to its full capacity, it is desirable that the separate water storage tanks be utilizable independently as well as in tandem. For example, on sunny days, it is desirable to use only the solar energy heated water storage tank while the conventional water storage tank is shut off from the water system. On the other hand, on cloudy days, it is desirable to utilize both water storage tanks in tandem whereby the solar energy heated tank feeds warm water to the conventionally heated tank so that less energy is required to heat the water to the desired working temperature. It is also desirable to be able to isolate the tanks whereby repairs may be made on either of the tanks without requiring the entire water system to be shut down. Heretofore, the usual practice has been to provide numerous valves in both the solar energy system and in the conventional water supply system to effect the aforementioned purposes, the valves being widely disbursed throughout both of the systems and the building in which the systems are installed, often in arrangements commonly known as "plumbers' nightmares". Consequently, it is difficult for the users of such systems to comprehend which valves must be opened or closed to achieve the desired results. Moreover, the valves may be situated in relatively inaccessible as well as widely disbursed locations with the result that considerable physical effort may be required on the part of the users of the system to open and close the valves to effect the desired distribution of water.

An object of the present invention is to overcome the above as well as other disadvantages in solar energy heating systems of the indicated character and to provide an improved control valve unit which may be easily and quickly installed in a readily accessible location and which enables selective independent and/or combined utilization of separate solar energy heated and conventionally heated water storage tanks.

Another object of the present invention is to provide an improved control valve unit for controlling the flow of water through a solar energy system that includes a solar energy heated water storage tank and a conventionally heated water storage tank, the control valve unit incorporating improved valve means which may be easily understood and operated by the users of the system whereby maximum energy savings may be effected with a minimum of intellectual and physical effort on the part of the users thereof.

Another object of the present invention is to provide an improved control valve unit which meets all applicable plumbing codes.

Another object of the present invention is to provide an improved control valve unit for controlling the flow of water through a solar energy system that includes a solar energy heated water storage tank, the control valve unit incorporating improved means for independently isolating both tanks, as for repair purposes, without requiring shut down of the water distribution system.

Another object of the present invention is to provide an improved control valve unit that is economical to manufacture and assemble, durable, efficient, and reliable in operation.

The above as well as other objects and advantages of the present invention will become apparent from the following description, the appended claims and the accompanying drawings.

BRIEF DESCRIPTION OF THE DRAWINGS

FIG. 3 is a perspective view of the control valve unit illustrated in FIG. 2, with the housing thereof shown in dotted lines for clarity of illustration;

FIG. 4 is a cross sectional view of the structure illustrated in FIG. 3, taken on the line 4—4 thereof; and FIG. 5 is an elevational view of a label which may be fixed on or near the control valve unit for user instruction purposes.

DETAILED DESCRIPTION

Figure 1:
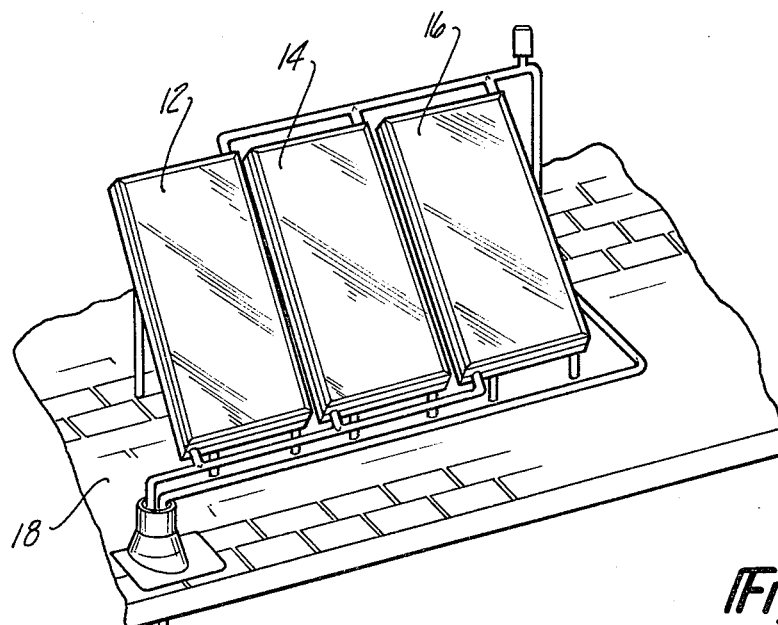
FIG. 1 is a perspective view illustrating the widely disbursed valves of a typical prior art solar energy system.

Referring to the drawings, the widely disbursed valves of a typical prior art solar energy heated domestic water system, generally designated 10, are illustrated in FIG. 1. As shown in FIG. 1, the prior art system 10 includes parallel solar collectors 12, 14 and 16 mounted on the roof 18 of a residential or commercial building. A suitable liquid is pumped up through supply piping 20 to the solar collectors 12, 14 and 16 through the agency of a pump 22, and after being heated by the solar collectors, the liquid is carried by return piping 24 to a heat exchange coil 26 disposed in a water storage tank 28 whereby the solar energy heated liquid is utilized to heat the water in the water storage tank 28. In the prior art system illustrated, cold water is supplied to the tank 28 through a cold water supply pipe 30, and hot water from the tank 28 is supplied to the building hot water system by a hot water supply pipe 32. Also in the prior art system illustrated, the storage tank 28 is provided with an internal electric heater coil (not shown) which may be energized, for example, by a conventional 240 volt power line 34. As shown in FIG. 1, in addition to the components previously mentioned, the typical prior art system 10 includes a shut off valve 36, a check valve 38, a drain valve 40, a pressure gauge 42, a pressure relief valve 44, an expansion tank 46, a drain valve 48, a drain valve 50, a shut off valve 52, a drain valve 54, a shut off valve 56, a drain valve 58, and a mixing valve 60, such components being conected in the system piping as illustrated in FIG. 1. It will be noted that the aforementioned valves are widely disbursed and somewhat confusingly similar, and that it would not be readily apparent to an ordinary user of the system which valves should be opened or closed if it is desired to achieve independent and/or combined utilization of the solar energy heated and conventionally heated water.

Figure 2:
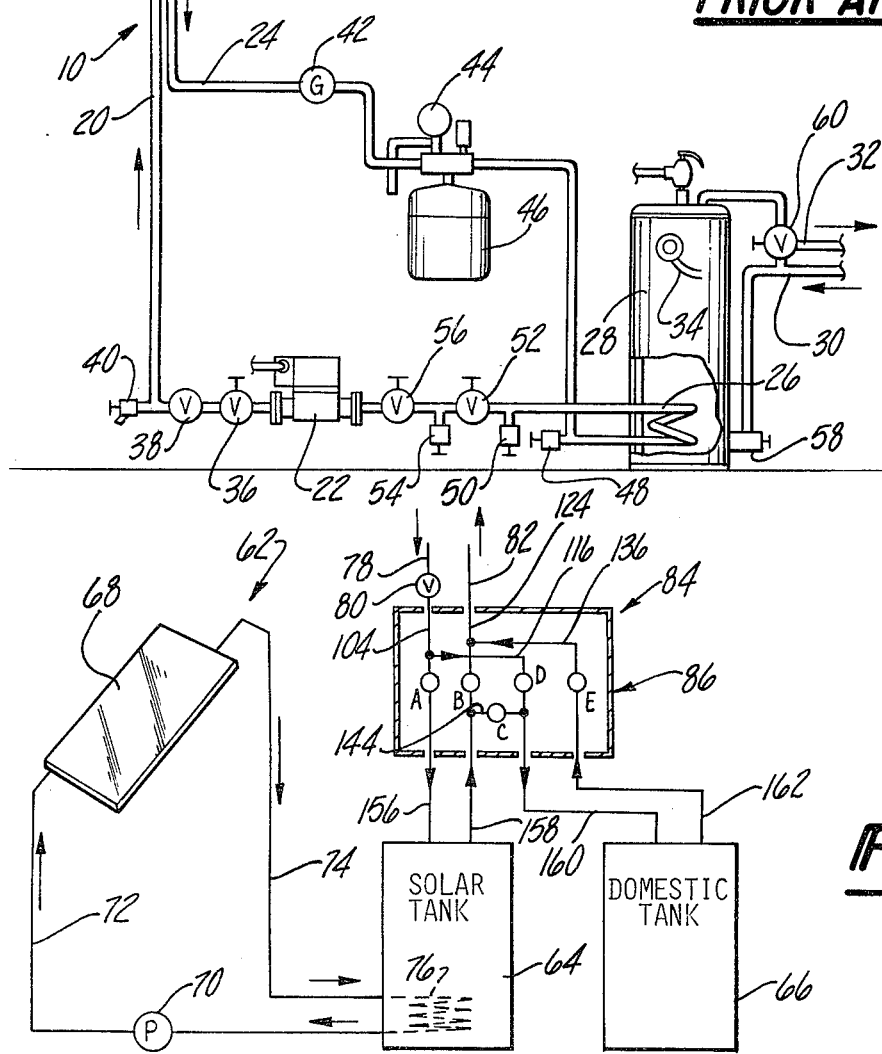
FIG. 2 is a schematic view of a solar energy system incorporating a control valve unit embodying the present invention.

FIG. 2 illustrates schematically a solar energy water system, generally designated 62, which includes a solar energy heated water tank 64 and a conventionally heated water tank 66 which may be heated, for example, by the burning of gas, oil, coal, wood or by electric heating means. The system illustrated in FIG. 2 also includes one or more solar collectors 68 which may be mounted on the roof of a residential or commercial building and through which a suitable liquid is pumped, by a pump 70, through the agency of a supply pipe 72. After being heated by the solar collector 68, the liquid is carried by a return pipe 74 to a heat exchange coil 76 disposed in the solar energy heated water tank 64, whereby the solar energy heated liquid is utilized to heat water in the tank 64. The water system illustrated in FIG. 2 also includes a cold water supply pipe 78 having a check valve 80 therein whereby reverse flow of water through the cold water supply pipe 78 is prevented. Hot water is supplied to the building hot water system by a hot water supply pipe 82.

In accordance with the present invention, a control valve unit, generally designated 84, is provided which may be installed in a readily accessible location, which may be easily understood and operated by the users of the solar energy system, and which enables the selective independent and/or combined utilization of the separate solar energy heated water storage tank 64 and the conventionally heated water storage tank 66 whereby maximum energy savings may be effected with a minimum of intellectual and physical effort on the part of the users thereof.

The control valve unit 84 is comprised of a housing 86 having top and bottom walls 88 and 90 integrally joined by side walls 92 and 94 and a front wall 96, the top, bottom and side walls terminating at flanges, such as 98 and 100 which facilitate fastening the housing to a suitable support, such as 102. The control valve unit 84 also includes a first inlet pipe 104 the end portions 106 and 108 of which project through openings 110 and 112, respectively, in the top and bottom walls, respectively, of the housing while the central portion 114 of the inlet pipe 104, which is disposed within the housing, is provided with a gate valve A that controls the flow of water through the pipe 104. A second inlet pipe 116 is provided one end portion 118 of which is connected to the inlet pipe 104 at a position within the housing upstream of the gate valve A while the opposite end portion 120 of the pipe 116 projects through an opening in the bottom wall 90 of the housing and terminates outside the housing 86. The intermediate portion 122 of the inlet pipe 116, which is disposed within the housing, is provided with a gate valve D which controls the flow of water through the pipe 116.

The control valve unit 84 also includes a first outlet pipe 124 the end portions 126 and 128 of which project through openings 130 and 132, respectively, provided in the top and bottom walls of the housing while the central portion 134 of the outlet pipe 124, which is disposed within the housing, is provided with a gate valve B that controls the flow of water through the outlet pipe 124. A second outlet pipe 136 is provided, one end portion 138 of which is connected to the outlet pipe 124 at a position within the housing downstream of the gate valve B while the opposite end portion 140 of the outlet pipe 136 projects through an opening 142 provided in the bottom wall 90 of the housing and terminates outside the housing. The central portion of the outlet pipe 136 which is disposed within the housing is provided with a gate valve E that controls the flow of water through the outlet pipe 136. The control valve unit 84 also includes a cross pipe 144 which is disposed completely within the housing, one end portion 146 of the cross pipe 144 being connected to the outlet pipe 124 at a position upstream of the gate valve B while the opposite end portion 148 of the cross pipe 144 is connected to the second inlet pipe 116 at a position downstream of the gate valve D. The central portion of the cross pipe 144 is provided with a gate valve C that controls the flow of water through the cross pipe 144.

As shown in FIGS. 3 and 4, each of the gate valves A, B, C, D and E includes a stem portion, such as 150, which projects through an aligned opening, such as 152, provided in the front wall of the housing. The gate valves A, B, C, D and E are each provided with a manually operable wheel, such as 154, the wheels being disposed outside the front wall of the housing and being fixed to the stems of the associated gate valves whereby the valves may be manually opened and closed as desired.

In the preferred embodiment of the invention illustrated, the axes of the operating wheels of the gate valves A, B, D and E are disposed in horizontally aligned relationship across the front wall of the housing while the axis of the operating wheel of the gate valve C is disposed intermediate and below the operating wheels of the gate valves A, B, D and E.

In the installation of the control valve unit 84, the outer end portion 106 of the inlet pipe 104 is connected to the cold water supply line 78 of the building water system while the other end portion 108 of the inlet pipe 104 is connected to the inlet pipe 156 of the tank 64. The outer end portion 126 of the outlet pipe 124 is connected to the hot water supply pipe 82 of the building water system while the end portion 128 of the outlet pipe 124 is connected to the outlet pipe 158 of the tank 64. The end portion 120 of the pipe 116 is connected to the inlet pipe 160 of the tank 66 and the end portion 140 of the outlet pipe 136 is connected to the outlet 162 of the tank 66. As previously mentioned, the housing 86 of the control valve unit 84 may be mounted in any convenient location where the operating wheels of the gate valves are readily accessible by users of the system. In the operation of the control valve unit 84, when it is desired to provide hot water to the building water system from the tank 66 only, the gate valves A, B and C are closed while the gate valves D and E are opened. Cold water will then flow from the cold water supply line 78 through the portion of the inlet pipe 104 upstream of the gate valve A, through the inlet pipe 116 and through the inlet pipe 160 to the tank 66. Hot water will flow from the tank 66 through the pipe 162, the outlet pipe 136, and the portion of the outlet pipe 124 downstream of the gate valve B to the hot water supply line 82 of the building water system.

When it is desired to utilize both the tank 64 and the tank 66 in tandem, the gate valve A is opened, the gate valve B is closed, the gate valve C is opened, the gate valve D is closed and the gate valve E is opened. Cold water will then flow from the cold water supply line 78 through the inlet pipe 104 and the inlet pipe 156 to the tank 64. Water from the tank 64 will then flow through the outlet pipe 158 and the portions of the pipe 124 upstream of the gate valve B, through the cross pipe 144, through the portions of the inlet pipe 116 downstream of the gate valve D and the inlet pipe 160 to the tank 66. Hot water will then flow through the outlet pipe 162 through the outlet pipe 136 and the portions of the outlet pipe 124 downstream of the gate valve B to the hot water supply line 82 of the building water system.

When it is desired to utilize hot water from the tank 64 only, the gate valves A and B are opened and the gate valves C, D and E are closed. Cold water will then flow from the cold water supply line 78 through the inlet pipe 104 and the pipe 156 to the tank 64 and solar heated water from the tank 64 will flow through the outlet pipe 158 and the outlet pipe 124 to the hot water supply line 82 of the building water supply system.

FIG. 5 illustrates a label which may be fixed on or near the control valve unit 84 to instruct the user in the operation of the control valve unit 84 whereby the user may achieve the desired results with a minimum of intellectual effort.

While the control valve unit has been illustrated and described as utilizing manually operated gate valves, it will be understood that electrically operated valves may be substituted for the manually operated valves so that it is merely necessary to open or close an electrical switch to open and close the valves controlling the flow of water through the control valve unit.

While a preferred embodiment of the invention has been illustrated and described, it will be understood that various changes and modifications may be made without departing from the spirit of the invention.

What is claimed is:

1. A control valve unit comprising, in combination, a housing having top and bottom walls and a front wall, a first inlet pipe, the opposite end portions of said first inlet pipe projecting through said top and bottom walls of said housing, the central portion of said first inlet pipe being disposed within said housing, a first valve connected to said central portion of said first inlet pipe and controlling the flow of water through said first inlet pipe, a second inlet pipe, one end portion of said second inlet pipe being connected to said first inlet pipe at a position within said housing upstream of said first valve, the opposite end portion of said second inlet pipe projecting through said bottom wall of said housing, the intermediate portion of said second inlet pipe being disposed within said housing, a second valve connected to said intermediate portion of said second inlet pipe and controlling the flow of water through said second inlet pipe, a first outlet pipe, the opposite end portions of said first outlet pipe projecting through said top and bottom walls of said housing, the central portion of said first outlet pipe being disposed within said housing, a third valve connected to said central portion of said first outlet pipe and controlling the flow of water through said first outlet pipe, a second outlet pipe, one end portion of said second outlet pipe being connected to said first outlet pipe at a position within said housing downstream of said third valve, the opposite end portion of said second outlet pipe projecting through said bottom wall of said housing, the central portion of said second outlet pipe being disposed within said housing, a fourth valve connected to said central portion of said second outlet pipe and controlling the flow of water through said second outlet pipe, a cross pipe disposed within said housing, one end portion of said cross pipe being connected to said first outlet pipe at a position upstream of said third valve, the opposite end portion of said cross pipe being connected to said second inlet pipe at a position downstream of said second valve, and a fifth valve disposed intermediate the end portions of said cross pipe and controlling the flow of water through said cross pipe.

2. The combination as set forth in claim 1 including manually actuatable means disposed outside said housing and controlling the opening and closing of said first, second, third, fourth and fifth valves.

3. The combination as set forth in claim 2 including user instructional indicia means carried by said housing.

4. The combination as set forth in claim 1, said first, second, third, fourth and fifth valves each being a gate valve.

5. A control valve unit for controlling the flow of water through a solar energy system that includes a cold water supply, a hot water supply, a solar energy heated water storage tank having an inlet and an outlet, and a conventionally heated water storage tank having an inlet and an outlet, said control valve unit comprising, in combination, a housing, a first inlet pipe, first valve means controlling the flow of water through said first inlet pipe, a second inlet pipe, one end portion of said second inlet pipe being connected to said first inlet pipe at a position upstream of said first valve means, second valve means controlling the flow of water through said second inlet pipe, a first outlet pipe, third valve means controlling the flow of water through said first outlet pipe, a second outlet pipe, one end portion of said second outlet pipe being connected to said first outlet pipe at a position downstream of said third valve means, fourth valve means controlling the flow of water through said second outlet pipe, a cross pipe, one end portion of said cross pipe being connected to said first outlet pipe at a position upstream of said third valve means, the opposite end portion of said cross pipe being connected to said inlet pipe at a position downstream of said second valve means, and fifth valve means controlling the flow of water through said cross pipe, one end portion of said first inlet pipe being connectible to said cold water supply, the other end portion of said first inlet pipe being connectible to said inlet of said solar energy heated tank, the other end portion of said second inlet pipe being connectible to said inlet of said conventionally heated tank, one end portion of said first outlet pipe being connectible to said hot water supply, the other end portion of said first outlet pipe being connectible to said outlet of said solar energy heated tank, the other end portion of said second outlet pipe being connectible to said outlet of said conventionally heated tank.

6. The combination as set forth in claim 5, said first, second, third, fourth and fifth valve means being connected to said pipes within said housing.

7. The combination as set forth in claim 5 including manually actuatable means disposed outside said housing and controlling the opening and closing of said valve means.

8. The combination as set forth in claim 5, said first, second, third, fourth and fifth valve means each being a gate valve.

9. A control valve unit for controlling the flow of water through a solar energy system that includes a cold water supply, a hot water supply, a solar energy heated water storage tank having an inlet and an outlet, and a conventionally heated water storage tank having an inlet and an outlet, said control valve unit comprising, in combination, a housing having top and bottom walls integrally joined by side walls and a front wall, a first inlet pipe, the opposite end portions of said first inlet pipe projecting through said top and bottom walls of said housing, the central portion of said first inlet pipe being disposed within said housing, a first valve connected to said central portion of said first inlet pipe and controlling the flow of water through said first inlet pipe, a second inlet pipe, one end portion of said second inlet pipe being connected to said first inlet pipe at a position within said housing upstream of said first valve, the opposite end portion of said second inlet pipe projecting through said bottom wall of said housing, the intermediate portion of said second inlet pipe being disposed within said housing, a second valve connected to said intermediate portion of said second inlet pipe and controlling the flow of water through said second inlet pipe, a first outlet pipe, the opposite end portions of said first outlet pipe projecting through said top and bottom walls of said housing, the central portion of said first outlet pipe being disposed within said housing, a third valve connected to said central portion of said first outlet pipe and controlling the flow of water through said first outlet pipe, a second outlet pipe, one end portion of said second outlet pipe being connected to said first outlet pipe at a position within said housing downstream of said third valve, the opposite end portion of said second outlet pipe projecting through said bottom wall of said housing, the central portion of said second outlet pipe being disposed within said housing, a fourth valve connected to said central portion of said second outlet pipe and controlling the flow of water through said second outlet pipe, a cross pipe disposed within said housing, one end portion of said cross pipe being connected to said first outlet pipe at a position upstream of said third valve, the opposite end portion of said cross pipe being connected to said second inlet pipe at a position downstream of said second valve, and a fifth valve disposed intermediate the end portions of said cross pipe and controlling the flow of water through said cross pipe, one end portion of said first inlet pipe being connectible to said cold water supply, the other end portion of said first inlet pipe being connectible to said inlet of said solar energy heated tank, said opposite end portion of said second inlet pipe being connectible to said inlet of said conventionally heated tank, one end portion of said first outlet pipe being connectible to said hot water supply, the other end portion of said first outlet pipe being connectible to said outlet of said solar energy heated tank, said opposite end portion of said second outlet pipe being connectible to said outlet of said conventionally heated tank.

10. The combination as set forth in claim 9 including manually actuatable means disposed outside said housing and controlling the opening and closing of said first, second, third, fourth and fifth valves.

11. The combination as set forth in claim 10, said first, second, third, fourth and fifth valves each being a gate valve.

12. The combination as set forth in claim 11 including user instructional indicia means carried by said housing.

* * * * *